US010210461B2

(12) United States Patent
Biem et al.

(10) Patent No.: US 10,210,461 B2
(45) Date of Patent: Feb. 19, 2019

(54) RANKING DATA ANALYTICS RESULTS USING COMPOSITE VALIDATION

(71) Applicant: INTERNATIONAL BUSINESS MACHINES CORPORATION, Armonk, NY (US)

(72) Inventors: Alain Biem, Yorktown Heights, NY (US); Nagui Halim, Yorktown Heights, NY (US); Srinivasan Parthasarathy, Yorktown Heights, NY (US); Daby M. Sow, Yorktown Heights, NY (US); Deepak S. Turaga, Yorktown Heights, NY (US); Long H. Vu, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 999 days.

(21) Appl. No.: 14/222,143

(22) Filed: Mar. 21, 2014

(65) Prior Publication Data
US 2015/0269157 A1 Sep. 24, 2015

(51) Int. Cl.
G06F 17/30 (2006.01)
G06N 99/00 (2010.01)
(52) U.S. Cl.
CPC ................... G06N 99/005 (2013.01)
(58) Field of Classification Search
CPC .................................................. G06N 99/005
USPC ......................................................... 707/603
See application file for complete search history.

(56) References Cited

U.S. PATENT DOCUMENTS

| 7,756,804 | B2 * | 7/2010 | Bloom .............. G06F 17/30598 706/46 |
| 8,340,363 | B2 | 2/2012 | Sarkar et al. |
| 8,359,279 | B2 | 1/2013 | Fisher et al. |
| 8,392,153 | B2 | 3/2013 | Pednault et al. |
| 8,392,352 | B2 | 3/2013 | Kofman et al. |
| 8,407,176 | B2 | 3/2013 | Boettcher et al. |

(Continued)

OTHER PUBLICATIONS

Fayyad et al., "From Data Mining to Knowledge Discovery in Databases," AI Magazine vol. 17 No. 3 (1996).

(Continued)

*Primary Examiner* — Tony Mahmoudi
*Assistant Examiner* — Michael Le
(74) *Attorney, Agent, or Firm* — F. Chau & Associates, LLC.

(57) ABSTRACT

A method for performing assisted knowledge discovery includes receiving a dataset. Each of a plurality of analytical techniques is applied to the received data set to generate a plurality of corresponding analytical results. A composite validation metric is applied to each of the plurality of analytical results. The composite validation metric is a single scoring/ranking function that is created from a plurality of different scoring/ranking functions. The plurality of analytical results is presented to a user arranged in accordance with the results of the applying the composite validation metric to each of the plurality of analytical results. A selection from the user from among the plurality of analytical results is recorded. The user's selection is used to modify the composite validation metric such that the analytical techniques responsible for generating the selected analytical result is scored/ranked more highly.

11 Claims, 4 Drawing Sheets

(56) References Cited

U.S. PATENT DOCUMENTS

| | | |
|---|---|---|
| 8,417,653 B2 | 4/2013 | Probst et al. |
| 2003/0033127 A1* | 2/2003 | Lett .................. G06T 5/002 703/11 |
| 2009/0193039 A1* | 7/2009 | Bradley ............ G06F 17/30539 |
| 2010/0241698 A1* | 9/2010 | Hillerbrand ............. H04L 12/24 709/203 |

OTHER PUBLICATIONS

Han et al., "Knowledge Discovery in Databases: An Attribute-Oriented Approach," Proceedings of the 18th VLDB Conference, Vancouver, British Columbia, Canada 1992.

Frawley et al., "Knowledge Discovery in Databases: An Overview" AI Magazine vol. 13 No. 3 (1992).

Stumme, "Conceptual knowledge discovery in databases using formal concept analysis methods." Springer Berlin Heidelberg, 1998.

Ester et al., "Knowledge Discovery in Large Spatial Databases: Focusing Techniques for Efficient Class Identification," Proc. of the Fourth Int. Symposium on Large Spatial Databases (SSD '95), Portland, Maine, USA, Lecture Notes in Computer Science, Springer, 1995.

\* cited by examiner

RANKING DATA ANALYTICS RESULTS USING COMPOSITE VALIDATION

This invention was made with Government support under Contract No.: H98230-11-C-0276 awarded by the Department of Defense (DOD). The government has certain rights in this invention.

TECHNICAL FIELD

The present disclosure relates to data analytics and, more specifically, to knowledge discovery in data analytics.

DISCUSSION OF THE RELATED ART

Data analytics relates to the processing of large data sets to derive insightful information that may be presented in a highly usable fashion. While data analytics may include a large number of data processing operations, three primary groups of operations include summarization operations in which data sets may be succinctly characterized or described. Organizing operations may be used to cluster, order, rank, or otherwise arrange data in a way that makes it easier for a human user to hone in on the data that is most relevant to that user. Patterning operations may be used to identify meaningful patterns within the data so that a human user can more easily distill the significance of large data sets. While there are many forms of data analytics that may fit into more than one of these categories, or perhaps none at all, the above are offered as an example of common data analytics operations.

As mentioned above, clustering is one particular form of data analytics that may be described as an organizing operation. In clustering, items of data are arranged into groups according to shared characteristics. Clustering may be particularly useful in order to visualize a broader context of data. However, the same set of data may be clustered in many different ways. For example, a data set including all portable computers purchased in a year may be clustered by form factor, such as desktop, laptop, tablet, etc. The same dataset may alternatively be clustered by brand, microprocessor, operating system, etc.

Approaches are available for automatically clustering data sets for examination by a human analyst. However, because of the great many ways that are available to cluster data, it may be difficult for the automated process to provide the analyst with a clustering approach that the analyst considers to be optimal.

Exploratory data analysis is the process of exploring important characteristics of a dataset or discovering data-driven insights into its domain. The human analyst may perform exploratory data analytics by building statistical models on the data in order to make useful interpretations through the observation of anomalies, relationships or patterns discovered using those models. However, this method may be iterative in nature of model building and interpretation, and this may consume large amount of analyst time and input. Moreover, the model construction process may be highly manual, and may require the analyst to wire together analytics, write code, and then manage the deployment of the code on the compute platform.

SUMMARY

A method for performing assisted knowledge discovery includes receiving a dataset. Each of a plurality of analytical techniques is applied to the received data set to generate a plurality of corresponding analytical results. A composite validation metric is applied to each of the plurality of analytical results. The composite validation metric is a single scoring/ranking function that is created from a plurality of different scoring/ranking functions. The plurality of analytical results is presented to a user arranged in accordance with the results of the applying the composite validation metric to each of the plurality of analytical results. A selection from the user from among the plurality of analytical results is recorded. The user's selection is used to modify the composite validation metric such that the analytical techniques responsible for generating the selected analytical result is scored/ranked more highly.

The plurality of analytical techniques may be a plurality of different clustering techniques and the plurality of corresponding analytical results may be a plurality of different clusterings of the same received dataset.

The plurality of analytical techniques may include frequent pattern mining techniques, anomaly detection techniques, or factor analysis techniques.

The composite validation metric may include elements from each of the plurality of different scoring/ranking functions along with a set of parameters that defines a relative weighing of each element within the composite validation metric. Using the user's selection to modify the composite validation metric may include changing the relative weighing of the elements.

The presenting of the results may include listing the results according to rank order as determined by the composite validation metric. The presenting of the results may include listing the results alongside a score determined by the composite validation metric.

Using the user's selection to modify the composite validation metric may include employing one or more learning algorithms.

The method may additionally include receiving a second data set, applying each of the plurality of analytical techniques to the received second data set to generate a second plurality of corresponding analytical results, applying the modified composite validation metric to each of the second plurality of analytical results, and presenting the second plurality of analytical results to the user arranged in accordance with the results of the applying the modified composite validation metric to each of the second plurality of analytical results.

Presenting the plurality of analytical results to the user may include presenting a subset of highest-scoring/ranking results.

A method for performing assisted knowledge discovery includes receiving a dataset. Each of a plurality of clustering techniques is applied to the received data set to generate a plurality of corresponding clustering results. A composite validation metric is applied to each of the plurality of clustering results to place the results in an order of importance. The composite validation metric is a single scoring/ranking function that is created by combining a plurality of different scoring/ranking functions. The plurality of clustering results is presented to a user arranged in the order determined by applying the composite validation metric. A selection is received from the user from among the plurality of clustering results. The user's selection is used to modify the composition of the composite validation metric.

The composite validation metric may include elements from each of the plurality of different scoring/ranking functions along with a set of parameters that defines a relative weighing of each element within the composite validation metric.

Using the user's selection to modify the composition of the composite validation metric may include changing the relative weighing of the elements.

Using the user's selection to modify the composition of the composite validation metric may include employing one or more learning algorithms to adapt the composite validation metric such that the clustering techniques responsible for generating the selected analytical result is scored/ranked more highly.

A method for performing assisted knowledge discovery includes receiving a dataset. A composite validation metric, that is a single scoring/ranking function created from a plurality of different scoring/ranking functions, is analyzed to determine which of a plurality of analytical techniques are unlikely to produce a high ranking/score when applied to the received data set. Each of the plurality of analytical techniques is applied to the received data set, except for those analytical techniques determined to be unlikely to produce a high ranking/score, to generate a plurality of corresponding analytical results.

Determining which of the plurality of analytical techniques are unlikely to produce a high ranking/score when applied to the received data set may include using one or more supervised learning techniques.

The method may further includes applying the composite validation metric to each of the plurality of analytical results and presenting the plurality of analytical results to a user arranged in accordance with the results of the applying the composite validation metric to each of the plurality of analytical results except for those analytical techniques determined to be unlikely to produce a high ranking/score.

The method may further include recording a selection from the user from among the plurality of analytical results and using the user's selection to modify the composition of the composite validation metric.

The composite validation metric may include elements from each of the plurality of different scoring/ranking functions along with a set of parameters that defines a relative weighing of each element within the composite validation metric.

Using the user's selection to modify the composition of the composite validation metric may include changing the relative weighing of the elements.

Using the user's selection to modify the composition of the composite validation metric may include employing one or more learning algorithms to adapt the composite validation metric such that the analytic techniques responsible for generating the selected analytical result is scored/ranked more highly.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
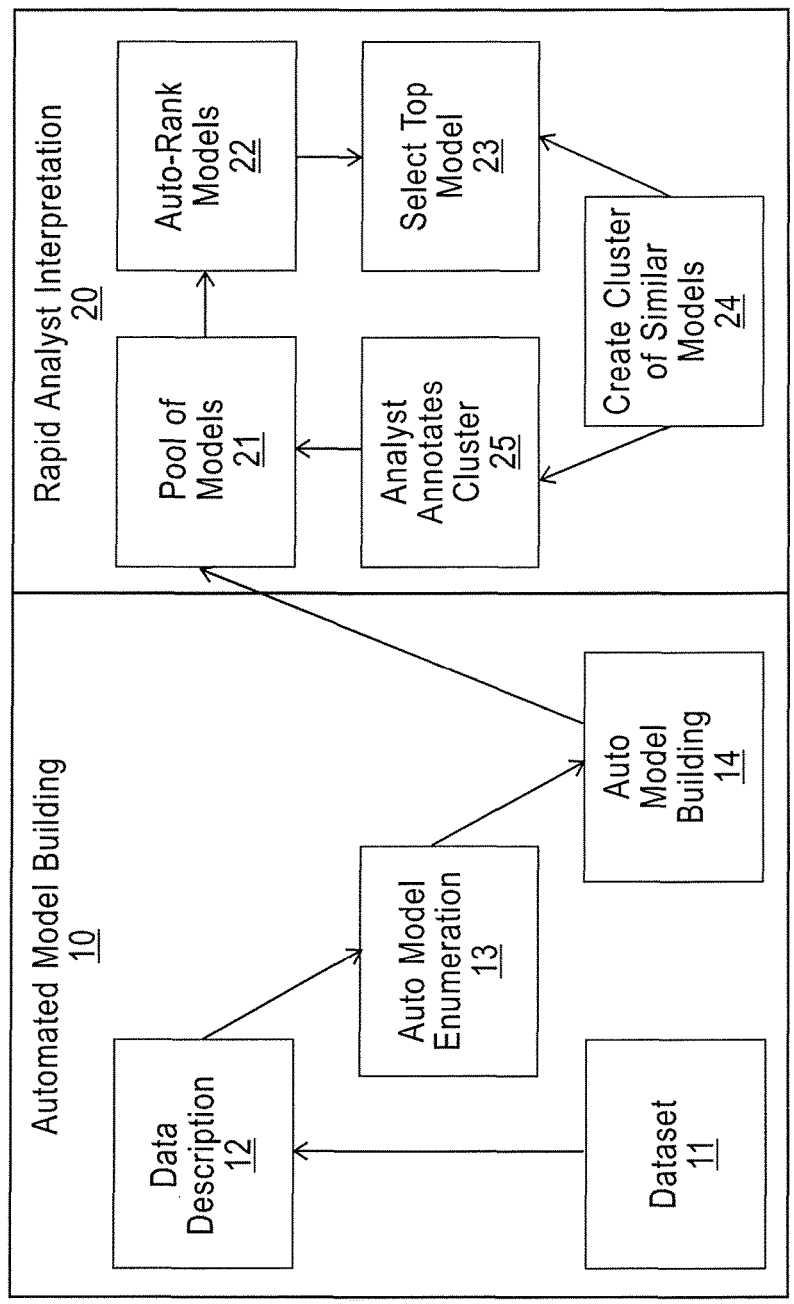
FIG. 1 is a flow diagram illustrating steps for dividing the analytical process into the steps of model building and analyst interpretation in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide various approaches for performing data analytics on large data sets to aid a human analyst in the understanding of the data.

An approach for performing data analytics involves optimizing composite validation. According to this approach, a dataset is received and each of a plurality of analytic functions is automatically applied to the received dataset. For example, the plurality of analytic functions may be clustering approaches where each clustering approach thereof uses a different set of clustering criteria. While exemplary embodiments of the present invention may be described herein in terms of clustering, it is to be understood that the various approaches for data analytics discussed herein may be applied to other forms of data analytics as well.

After the single dataset has been clustered multiple times in accordance with each of a plurality of different clustering approaches, it is possible to use each of a plurality of different metrics to assess the relative quality of each clustering set. For example, if there is one dataset and 10 clustering approaches, the same data set will be clustered 10 different ways. Then if there are, for example, 10 different metrics for assessing cluster quality, each of the 10 metrics may be applied to each of the 10 clustering results so that there may be a total of 100 different quality assessments.

However, as an alternative to computing each of the 100 different quality assessments, which may be computationally expensive, exemplary embodiments of the present invention may create a composite validation. The composite validation may be a combination of two or more of the different metrics for assessing cluster quality. The composite validation need not treat each constituent quality metric equally and may instead weight certain quality metrics more favorably than others.

The composite validation may be a scoring function that is used to rate each of the clustering results, wherein each clustering result represents a distinct data mapping. This rating may either assign a score to each clustering result or may rank the results from best to worst. It should be noted that as discussed herein, "clustering results" is the full set of data arranged into various clusters, "clustering results" is not intended to mean one particular cluster.

The analyst may then be presented with multiple copies of the same dataset, with each copy being clustered in accordance with a different clustering approach. Accordingly, the analyst may be presented with multiple clustering results. The presentment may be arranged from highest quality to lowest quality and it need not be necessary to present to the analyst all clustering results. For example, a set of top clustering results may be displayed or clustering results below a predetermined quality value may be hidden. Hidden clustering results may still be viewable by the analyst upon request. In this way, exemplary embodiments of the present invention may perform assisted knowledge discovery as the human user is assisted in the task of gleaming insight from vast data.

The human analyst may then review the multiple clustering results arranged in quality order. The analyst may then manually select a most relevant clustering result from among the set of presented clustering results. This most relevant clustering result may be the top ranked result, as ranked by the composite validation, however, this is not necessarily the case. Where the manually selected clustering result is not the top ranked result, exemplary embodiments of the present invention may modify the composite validation so as to increase the component of those quality metrics that would most favorably rate the manually selected clustering result. In this way, the composite validation may be modified to make it more likely that the result selected by the analyst is more highly ranked. Moreover, this modification of the composite validation may be performed even where the manually selected clustering result is the top ranked result. In such a case, the composite validation may be modified to reinforce the relative importance of the quality metrics within the composite validation that more favorably rank the manually selected clustering result. Modification of the composite validation may be performed, for example, using one or more machine learning techniques.

According to one exemplary embodiment of the present invention, the composite validation may include terms of each of the constituent quality metrics, each weighted by one or more parameters. Accordingly, setting values for the parameters of the composite validation may define the relative contribution of each quality metric. These parameters may initially be set to a default value, for example, one in which each constituent quality metric is equally weighted and it may be these parameters that are changed based on analyst selection. For example, one or more computer learning algorithms may be employed to determine an optimum value for each of the parameters of the composite validation based on user selections of the most relevant clustering result and information correlating the various user selections and those parameters of the composite validation that most contribute to the promotion of the clustering results selected by the analyst.

In this way, the automatic presentment of clustering results in quality order may become more effective at elevating best clustering results for enhanced visibility as the approach is used.

As discussed above, clustering may be performed on the same data set multiple times, each time employing a different set of clustering criteria. However, as described above, the composite validation may tend to favor particular clustering criteria over other clustering criteria. It is therefore possible that some of the clustering operations are not required to produce the composite validation, or the added value of performing certain clustering operations is otherwise not worth the added computational cost of performing those particular clustering operations.

Accordingly, exemplary embodiments of the present invention may seek to reduce the computational costs associated with performing clustering, or some other data analytics process, by examining the composite validation presently in use and determining which clustering techniques may be omitted while still resulting in a composite validation that is comprehensive or comprehensive enough so that a composite validation result may be obtained.

This concept may be combined with the approach discussed above and in such a case, as the composite validation is refined, the determination as to which clustering techniques may be omitted may change accordingly. However, this concept need not be combined with the approach discussed above and accordingly, wherever a composite validation may be applied to data analytics, the composite validation may be referenced prior to conducting the data analytics, such as clustering, so as to determine which data analytics approaches may be omitted. Thereafter, the non-omitted clustering approaches may be applied to the data set and the composite validation may be applied to the results thereof. The composite validation may also be modified somewhat to refrain from using the results of analytic approaches whose contribution to the composite validation is sufficiently small so as to not justify the computational expense associated with performing those analytical approaches.

A framework for rapid exploratory analysis of large volumes of data (READ) is provided herein, which may be used to enable a human analyst to more easily express the analytic logic and perform rapid interpretation. READ may enumerate the space of models along with automatic generation and deployment of optimized code. It may also provide visually interactive techniques to aid the analyst find interesting and related models.

The exploration process may be decomposed into components that can be independently specified. These components can be defined, reused or extended using simple choice points that may be expressed using rules. A systematic expression of the analytic workflow is used for automatic code generation, code execution and model validation. READ may be used to reduce the time required for exploration and understanding of a dataset from several days to a few hours.

The practice of data exploration may be prevalent across a wide variety of domains such as cyber-security, online consumer behavior analysis, healthcare, system failure analysis, to name a few. For example, the analysis of cyber monitoring data can identify malicious hosts or allow for the prediction of threats in a network. Analyzing the consumer behavior through user action logs, e.g., browsing histories, search terms, clicks etc., may be used to help in characterizing consumer preferences. For example, in the field of healthcare, the similarity of a patient's data to relevant cases in the past may be used as an early indicator of a need for further investigation. Exploratory analysis may be different from more focused data mining practices in the sense that the analyst is exploring the dataset to discover insights into it. The exploration may involve slicing and dicing the dataset, creating different types of (often unsupervised) statistical models to gain insights exposed through the examination of those models. Useful results may be found through the observation of anomalies, outliers, relationships, dependencies, correlations or other interesting patterns.

The process of data exploration may involve the analyst constructing a model on the data followed by interpretation, in an iterative manner, until some useful insights are found or the analyst runs out of the space of models. For example, in the domain of cyber-security, the dataset may comprise DNS query logs, e.g., essentially all the nslookup queries made by the hosts of a network—stored in this case using a large repository such as a warehouse, or a no-SQL store. The analyst may write several SQL/Hive queries one-by-one, for constructing different models on the given dataset. The models may be based on histograms, which may graphically represent the distribution of counts. Many models encountered in the process do not yield any significant observations. However, one model may show an anomalous host that was involved in a significantly larger number of queries than the rest. This may allow for identification of an interesting host in the network. For example, the particular host may likely be a DNS server while the other hosts may be clients within the same network.

This process may require a large amount of time as the analyst may explore a large number of iterations for a wide variety of models. For example, the analyst may spend time in writing a query or a procedure for model generation, and upon submitting the job, may wait for the model to be computed (this time may be significant for large datasets). Upon obtaining the model, the analyst may attempt to make interesting observations and, to the extent permissible, may record the relevant interpretation. Since this process requires a large number of iterations and models, it involves a significant effort from the analyst, and the time to discovery is high. Hence, if the time to explore models is limited, an analyst may miss out on important discoveries by not considering certain models in the first place. Moreover, the process may be dependent upon the skill set of the analyst in terms of data management, data analysis, query construction and statistical/visualization tools. The skilled analyst may be asked to effectively explore a large set of models and reach to useful conclusions.

Exemplary embodiments of the present invention may be used to reduce the analyst's effort and time to discovery. In so doing, a broad set of models may be explored without going through an iterative process. The process of model building may be automated in terms of generating and deploying code. Models may be effectively validated and only the potentially relevant ones may be selected for interpretation. Accordingly, READ may provide a systematic decomposition of the analytic process. Instead of viewing the model creation or interpretation as monolithic tasks, exemplary embodiments of the present invention may decompose the process in different abstract steps.

FIG. 1 is a flow diagram illustrating steps for dividing the analytical process into the steps of model building and analyst interpretation in accordance with exemplary embodiments of the present invention. In the first step of automated model building 10, a dataset 11 is sent to a data description unit 12 for describing the dataset 11. An automated model enumeration unit 13 is used to enumerate the described data. An automated model building unit 14 is then used to automatically build the model from the enumerated data.

In the second step 20, which is a rapid analyst interpretation step, a pool of models 21 is generated by the automated model building unit 14. A ranking unit 22 automatically ranks the models from the pool of models 21. A user interface 23 may be used to permit a user to select a top model from the results of the model ranking. A clustering unit 24 may then be used to create a cluster of models similar to the selected model. An annotation unit 25 may be used to solicit analyst annotations for each cluster and these annotations may be used to remove one or more models from the pool of models 21.

This approach may enable the analyst to systematically express any analytic workflow using simple rules and choice points. Based upon those rules and choice points, the framework may automatically enumerates the space of possible models, while allowing for analyst input into selection of models to construct. For all the desired models, optimized queries (for example, representing model construction analytics) may be automatically generated and deployed. Once the pool of models is obtained, the framework may support automatic computation of quantitative validation metrics for each model (for example, to map to analyst interest) and visual presentation of the models to the analyst in order of decreasing interest. Additionally, the system also supports the computation of similarity between models, to filter out redundant models automatically, and reduce the number of models an analyst needs to inspect. Both validation metrics and similarity metrics may be defined apriori, for example, by an analyst based on the desired goal of the exploration, and thresholds that determine the level of redundancy removal may be set using an interactive interface at runtime. The analyst may effectively try to interpret the models so-obtained. Accordingly, time may be save, analyst cycles may be reduced components from one workflow may be reusable in other workflows.

Exemplary embodiments of the present invention may provide for automation of model enumeration and execution along with rapid visual interpretation by decomposition of the analytic process. For example, according to some approaches, the model enumeration logic for any dataset may reside in the queries or code written by the analyst. As a result, several different queries may need to be formulated by the analyst to generate models. Exemplary embodiments of the present invention may break down this process into three parts: (1) data description, (2) model rules, and (3) model generation. Using certain analyst specifications in the first two parts, the framework may be able to figure out the entire set of models and generate them automatically sparing the analyst the burden of writing code or queries.

Data Description: In this stage, the analyst may provide a description about the data or meta-data. This may be done through either configuration files or a web interface. The description data may be stored in a table. This description may include information about the schema of a table, e.g., attribute names and their data types. The description may additionally include entity annotation, e.g., whether an attribute is an "entity', which represents a concept of interest for the analysis in this case. Several different concepts of interest may be defined by the analyst in this description. The description may also include the range of an attribute. More annotations may also be provided, where needed.

Model Enumeration: Based upon the data description, the possible set of models may be generated via rules for model enumeration. The rules may define several options for feature selection and model creation such as filter conditions, joins, group by, attribute for aggregation, statistical functions (such as counts, entropy etc.) and model specific functions such as the binning strategy for histograms. For example, two filter conditions may be established for any Boolean attribute, e.g., att.name=true and att.name=false. The rule may be fairly general and need not be written for a specific attribute, but may instead be written for the attribute type. Also, it is not necessary that the presence of one or more attributes of type Boolean be in the data. The rule may be activated where there is an object satisfying the when clause of the rule. The enumerated model space may be generated automatically using the rules and data description. This enumerated model space may be browsed by the analyst through, for example, an expandable/collapsable tree layout. Each path from the root to a leaf may represent one complete set of options for one model specification. The analyst may prune out certain branches of the tree to eliminate certain set of models from this space.

Model Building: Once the space of models has been enumerated, queries may be automatically generated and deployed. Additionally, multi-query optimization may be performed to avoid redundant computation across different queries. For example, each of the queries with the same filter and group by conditions may be merged into one composite query with multiple projections.

Model Validation: The pool of models, potentially thousands, may be interpreted by the analyst. Instead of providing each constructed model to the analyst for interpretation, exemplary embodiments of the present invention may provides a visually interactive mechanism for the analyst to select the top most interesting model validation metrics.

Model Clustering: multiple different models may suggest the same or similar facts. For example, box plots for counts on different attributes or those using a different statistical function (e.g., count, distinct count or entropy) for the same entity may likely point the same result (anomaly and more precisely, a primary or secondary DNS server in the cybersecurity example discussed above). Similar observations may be derived for other entities which exhibit anomalous behavior as well. Hence, for a model that seems to be of interest, the analyst may choose other similar models to make a collective observation. The criteria of similarity may be selected, for example, through drop-down menus. The threshold of similarity may be selected from a slider in an interactive manner, e.g., selecting "251" may display the 251st model by the similarity metric, apart from the original model itself.

Interpretation and Annotation: If the analyst finds the observation from a cluster of models interesting, the corresponding entities in the model may be labeled. In our example, the analyst may give a label of "server" or "dns server" to the anomalies. The labels may be stored in a non-sourcable table by default.

Exemplary embodiments of the present invention may be implemented using a medley of tools and platforms. For example, visually interactive components of data description and model enumeration may use D3 with Javascript enhancements. The rules specification may be created using a combination of Java and Drools engine. Queries may be generated in Hive and executed on a 14 node Hadoop cluster. The visually interactive component for analyst interpretation may be build in R and Shiny.

Figure 2:
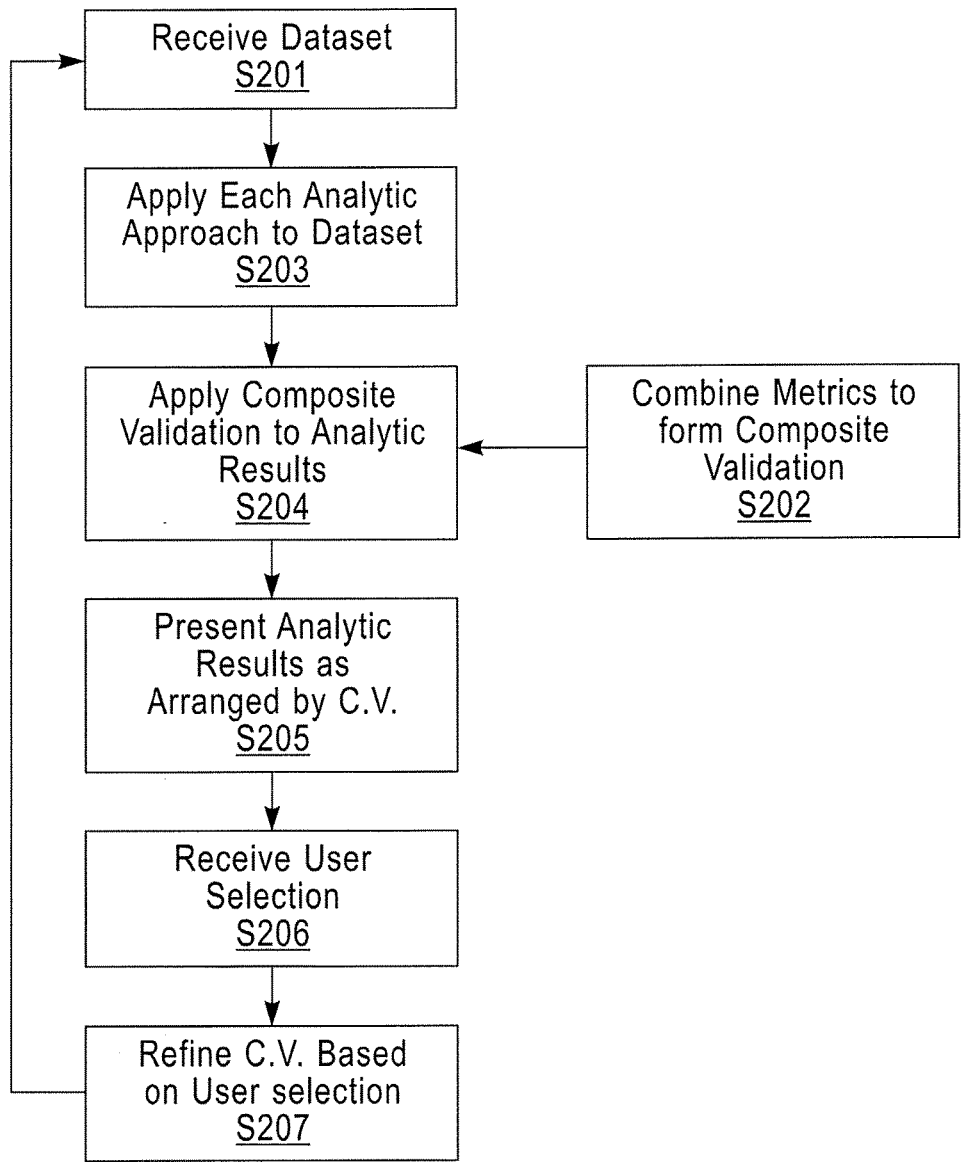
FIG. 2 is a flowchart illustrating an approach for performing data analytics in accordance with exemplary embodiments of the present invention.

Exemplary embodiments of the present invention are described below with reference to the figures, wherein FIG. 2 is a flowchart illustrating an approach for performing data analytics in accordance with exemplary embodiments of the present invention. First, a data set may be received (Step S201). Reception of the data set may include recalling stored data and/or receiving the data in real-time. For example, the data may be received over the Internet.

Either before the data is received, during the receiving of the data, or thereafter, a plurality of metrics for assessing the quality/validity of data analytics may be combined to form a composite validation (Step S202), which may be a singular scoring and/or ranking function. The composite validation may either consider each of the constituent metrics of the plurality of metrics equally or may weight/favor particular metrics and/or terms of metrics over others. For example, as described above, each metric and/or each term of each metric may be assigned a weighing that determines its relative influence on the composite validation.

The plurality of validation metrics that may together form the composite validation may include, for example when the data analytics involves clustering, validation metrics such as root-mean-square standard deviation, R-squared, modified Hubert F statistic, Calinski-Harabasz index, I index, Dunn's indices, Silhouette index, Davies-Bouldin index, Xie-Beni index, SD validity check, and S_Dbw validity index. Other validation metrics may be used.

As will be described in greater detail below, the relative weighting of each validation metric may be performed using computer-learning techniques. The resulting composite validation may be a single metric for rating/ordering the various results of the data analytics.

Each of a plurality of data analytics approaches may be applied to the received data set (Step S203). For example, in the case in which the applied analytical approaches represent clustering approaches, the data analytics approaches may be various different clustering approaches wherein using each approach, the same data is arranged differently. For example, the plurality of data analytics approaches may include various clustering algorithms such as K-Means, density clustering, nearest-neighbor, K-median, and Hierarchical clustering. Other clustering algorithms may be used.

The result of the application of the various data analytics approaches may be the same set of data arranged in different ways. Exemplary embodiments of the present invention seek to balance the objectives of presenting as much information as is needed to the human analyst and presenting the information in a way that is manageable and easy to derive understanding from. Accordingly, exemplary embodiments of the present invention seek to grade and/or order the results of the data analytics approaches. This may be done by applying the composite validation to each of the results (Step S204).

Therefore, rather than merely applying one particular known validation metric to each of the analytics results, which may be limiting, and rather than applying each and every known validation metric to each of the analytic results, which may be time consuming, computationally expensive, and generate more data than can be easily understood by the analyst, exemplary embodiments of the present invention apply one composite validation, formed from a plurality of validation metrics, to each of the analytic results.

The analytic results may thereafter be presented to the analyst in a manner that is conducive for appreciating which analytic result may be superior (Step S205). This may include, for example, displaying each of the analytic results from highest ranking to lowest ranking. Those analytic results that are either below a predetermined ranking or grading threshold may be omitted from the presentation. The analyst may thereafter command to see additional results that were omitted, if desired. Where the composite validation is used to generate a validation score, those scores may be displayed along with the corresponding results in the presentation.

The entirety of the analytic results need not be displayed. For example, only a portion of each analytical result might be initially displayed and the analyst may command to see its entirety. The analyst may select a desired analytic result from among those displayed (Step S206). Ideally the analyst will have selected the top-ranked analytic result, as determined by the composite validation, however, in practice, this may not always be the case. In either scenario, exemplary embodiments of the present invention may refine the composite validation in light of the selection made by the analyst (Step S207).

Refinement of the composite validation may employ one or more learning algorithms that can adapt the composite validation to increase the likelihood that during subsequent applications of the above-described approach, the composite validation elevates an analytical result, that will be selected by the analyst, to or towards the top of the ordering. Exemplary learning algorithms that may be employed include point-wise regression approaches, pair-wise classification approaches, list-wise approaches, active learning for optimizing analyst interaction, and transfer learning for reusability of scoring functions. Other learning algorithms may be used.

Thereafter, the process may be repeated with the receiving of a new data set (S201). However, at the step of combining the plurality of metrics into a composite validation (Step S202), the refined composite validation may be used.

As discussed above, exemplary embodiments of the present invention may reduce computational expense in the process of applying a composite validation to data analytics results to be obtained by applying a plurality of different analytics techniques to the data set by analyzing the composite validation to be used to assess the quality of the data analytics results and then to determine which of the data analytics techniques may be omitted. This determination as to which techniques to omit may be based on determining that the results from one or more particular techniques are unlikely to be highly ranked by the composite validation and therefore, there is less of a need to employ those data analytics techniques on the data set.

Figure 3:
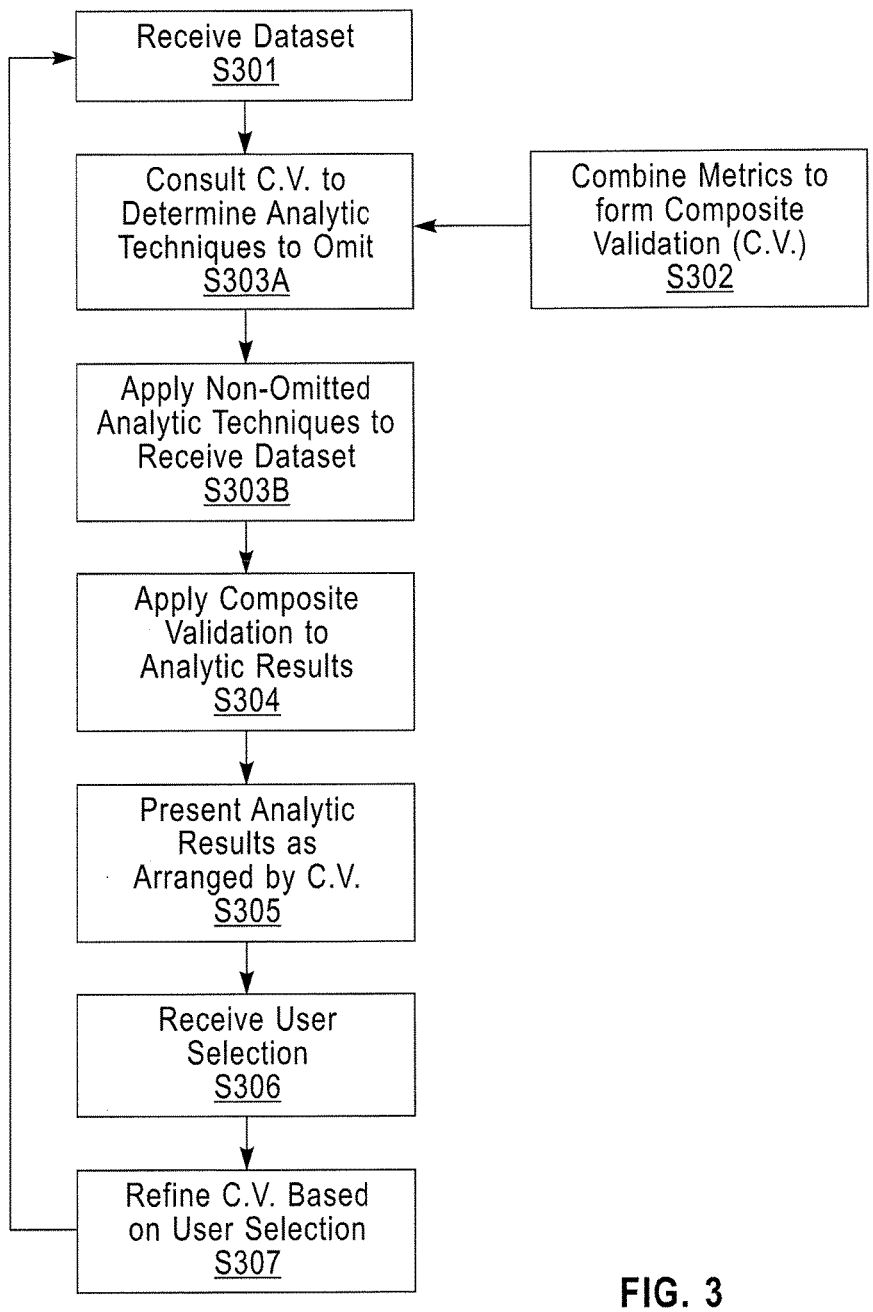
FIG. 3 is a flowchart illustrating an approach for performing data analytics in accordance with an exemplary embodiment of the present invention.

FIG. 3 is a flowchart illustrating an approach for performing data analytics in accordance with an exemplary embodiment of the present invention. As was described above, a data set may be received (Step S301). Separately, a plurality of different metrics for assessing data analytics result quality/validity may be combined to form a composite metric (Step S302), which, as with the case described above, may be a single metric incorporating the approaches of multiple different metrics, each of which may be weighted.

As was the case above, a plurality of different analytics techniques may be applied to the received data set. However, prior to applying the various analytics techniques to the data set, the composite validation may be consulted to identify which of the plurality of different analytics techniques need not be performed without adversely impacting the subsequent presentment of analytics results (Step S303A). For example, where the analytics techniques are clustering techniques, and the top five ranked clustering results are to be displayed to the analyst, exemplary embodiments of the present invention may determine which of the various clustering techniques are unlikely to generate a top-five ranked result so that those clustering techniques need not be performed. A margin of safety may also be included, for example, where the top five ranked clustering results are to be displayed, it may be determined which techniques are unlikely to generate a top-$50^{th}$ ranked result so that those techniques need not be performed. Thereafter the 50 results may be ranked and the top 5 may be presented.

Consultation of the composite validation for the purposes of determining which analysis techniques are likely to have low-rated results may involve the use of supervised learning. For example, each analysis technique may be treated as being described by a set of properties or features, independent of the dataset that are to be explored. These features may be referred to herein as Technique_Descriptors.

Applied to the case of clustering, exemplary features for a clustering algorithm may include the number of clusters that it generates, the distance function it uses (from a set of well defined distance functions, e.g. Euclidean distance, Mahalanobis distance, etc.), its typical sensitivity to noise, its robustness to missing values etc. These features may be derived from the description of the algorithm (e.g. from a textbook or paper where the technique is described) or derived empirically by running the technique on multiple sets of data.

According to an approach, each dataset may be described with a set of simple properties or features. These features may be referred to herein as Dataset_Descriptors. Exemplary features may include whether the dataset is high-dimensional or low-dimensional, does it have missing values, does it have numeric or non-numeric values etc.

According to an approach, the technique may be run on multiple training datasets and analyst ranking of the results produced by the technique on each of these datasets may be collected. For each run, the Technique_Descriptors (which may remain constant) may be stored along with the Dataset_Descriptors and the resulting ranking Rank.

According to an approach, a classifier C may be learned. This classifier may use standard supervised learning techniques (e.g. decision trees, support vector machines, neural nets, naive bayes etc.) to map the features (technique and dataset) to the rank achieved. Accordingly, C may map from {Technique_ Descriptors, Dataset_Descriptors} to Rank.

According to an approach, when a new dataset is received, the Dataset_Descriptors may be computed and coupled with the Technique_Descriptors, which may be already known, and the trained classifier C may be used to predict what the likely rank of the algorithm will be on the new dataset. Based on this likely rank, it may be decided whether or not to perform this technique on the classifier.

According to an approach, online learning may be used to determine which techniques need not be performed. For example, each time a technique gets selected for evaluation on a new dataset, its results may be used to update the ranking classifier function C. So, for example, if it is predicted that this was a good technique, but on the new dataset it did not rank highly, the function C may be updated to account for this error.

According to an approach, semantic relationships between techniques may be accosted for. For example, where it is known that certain sets of techniques are likely to perform similarly, the similarly-performing techniques may be grouped and one classifier/ranking function may be learned jointly for each grouping.

Thereafter, each of the plurality of analytics techniques, except for those determined to be omitted, may be applied to the received data set (Step S303B). The computational costs associated with performing the omitted techniques on the data set may thereby be avoided.

The composite validation may thereafter be calculated from the results of the analytical techniques that were performed on the non-omitted techniques (Step S304). The composite validation may be used to rate and/or order each of the results so as to determine a top set of results to present to the analyst user (Step S305). The top set of results, or even the entire set of results, may be presented to the user with or without their respective ratings/scores as calculated by the composite validation.

As described above, the analyst may be asked to select a desired result (Step S306) and the manner of calculating the composite validation may be refined based on the selection (S307) so as to increase the likelihood that the analyst will in the future find a most favorable result to be highly ranked.

It is to be understood, however, that the above-described approach for reducing computational expense associated with using a composite validation may be applied on any occasion that a composite validation is to be used to grade or rank a set of data analytics results. Accordingly, so long as the composite validation is referred to prior to performing the data analytics using the plurality of analytical approaches so as to determine which analytical approaches need not be performed, it is not necessary that the results of the analytical approaches that are graded or ranked be presented to the user, that the user be asked to select a desired result or that the selection be used to refine the composite validation.

Figure 4:
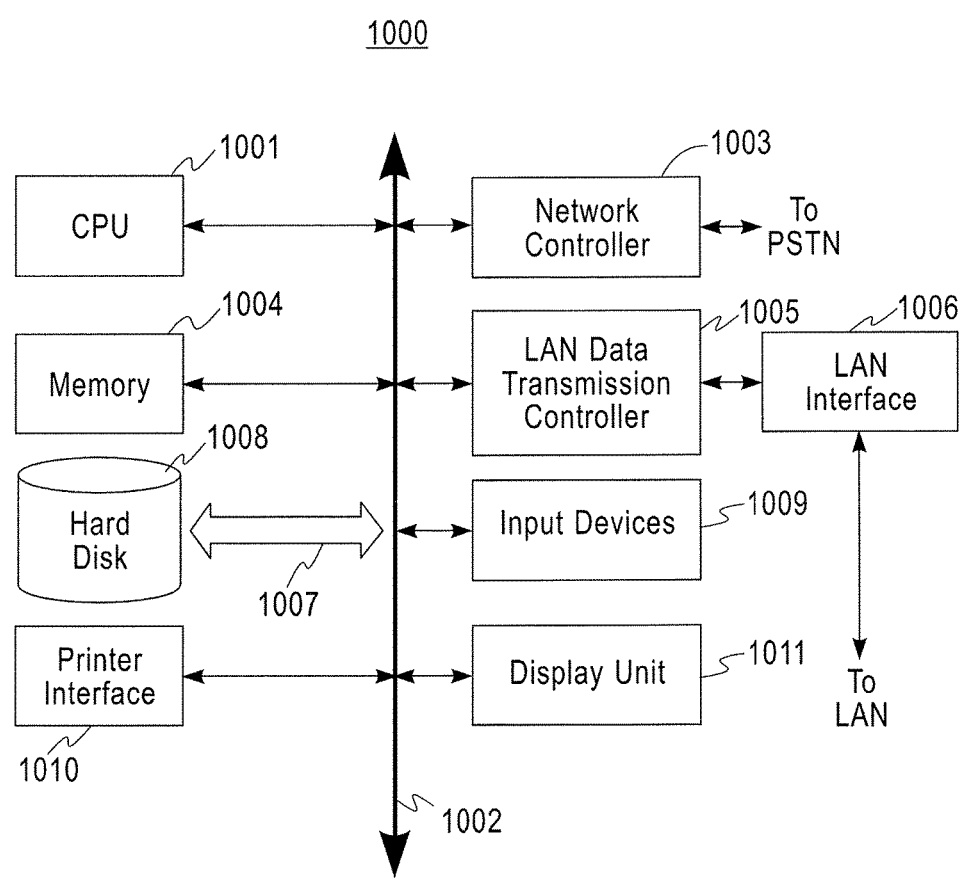
FIG. 4 shows an example of a computer system capable of implementing the method and apparatus according to embodiments of the present disclosure.

FIG. 4 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for performing assisted knowledge discovery, comprising:
   receiving a dataset;
   applying each of a plurality of different analytical techniques to the received data set to generate a plurality of corresponding analytical results;
   receiving a composite validation metric that is a single scoring or ranking function that is created from a plurality of different scoring or ranking functions, each of which is assigned a weighing that determines its relative influence on the composite validation metric;
   modifying the received composite validation metric by removing therefrom each of the plurality of different scoring or ranking functions that is assigned a weighing that is less than a predetermined value;
   applying the modified composite valuation metric to each of the plurality of analytical results;
   displaying the plurality of analytical results to a user arranged in accordance with the results of the applying the modified composite validation metric to each of the plurality of analytical results;
   recording a selection from the user from among the plurality of analytical results; and
   using the user's selection to refine the composite validation metric by changing one or more of the assigned weighing of the plurality of different scoring or ranking functions such that the analytical techniques responsible for generating the selected analytical result is scored or ranked more highly.

2. The method of claim 1, wherein the plurality of analytical techniques is a plurality of different clustering techniques and the plurality of corresponding analytical results is a plurality of different clusterings of the same received dataset.

3. The method of claim 1, wherein the plurality of analytical techniques includes frequent pattern mining techniques, anomaly detection techniques, or factor analysis techniques.

4. The method of claim 1, wherein the composite validation metric includes elements from each of the plurality of different scoring or ranking functions along with a set of parameters that defines a relative weighing of each element within the composite validation metric.

5. The method of claim 1, wherein the presenting of the results includes listing the results according to rank order as determined by the composite validation metric.

6. The method of claim 1, wherein the presenting of the results includes listing the results alongside a score determined by the composite validation metric.

7. The method of claim 1, wherein using the user's selection to modify the composite validation metric includes employing one or more learning algorithms.

8. The method of claim 1, additionally comprising:
   receiving a second data set;
   applying each of the plurality of analytical techniques to the received second data set to generate a second plurality of corresponding analytical results;
   applying the refined composite validation metric to each of the second plurality of analytical results; and
   displaying the second plurality of analytical results to the user arranged in accordance with the results of the applying the refined composite validation metric to each of the second plurality of analytical results.

9. The method of claim 1, wherein displaying the plurality of analytical results to the user includes displaying a subset of highest scoring or ranking results.

10. A method for performing assisted knowledge discovery, comprising:
    receiving a dataset;
    applying each of a plurality of different clustering techniques to the received data set to generate a plurality of corresponding clustering results;
    receiving a composite validation metric that is a single scoring or ranking function that is created by combining a plurality of different scoring or ranking functions, each of which is assigned a weighing that determines its relative influence on the composite validation metric;
    modifying the received composite validation metric by removing therefrom each of the plurality of different scoring or ranking functions that is assigned a weighing that is less than a predetermined value;
    applying the modified composite valuation metric to each of the plurality of analytical results to place the results in an order of importance;
    presenting the plurality of clustering results to a user arranged in the order determined by applying the modified composite validation metric;
    receiving a selection from the user from among the plurality of clustering results; and
    using the user's selection to refine the composition of the composite validation metric by changing one or more of the assigned weighing of the plurality of different scoring or ranking functions.

11. The method of claim 10, wherein using the user's selection to refine the composition of the composite validation metric includes employing one or more learning algorithms to adapt the composite validation metric such that the clustering techniques responsible for generating the selected analytical result is scored or ranked more highly.

* * * * *